(12) United States Patent
Hershman et al.

(10) Patent No.: US 11,321,458 B2
(45) Date of Patent: May 3, 2022

(54) SECURE IC WITH SOFT SECURITY COUNTERMEASURES

(71) Applicant: Nuvoton Technology Corporation, Hsin-chu (TW)

(72) Inventors: Ziv Hershman, Givat Shmuel (IL); Dan Morav, Herzliya (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 326 days.

(21) Appl. No.: 16/773,997

(22) Filed: Jan. 28, 2020

(65) Prior Publication Data

US 2021/0232679 A1 Jul. 29, 2021

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .. G06F 21/554; G06F 2221/034; G06F 21/77; G06F 11/22; G06F 11/3055; G06F 11/0751; G06F 11/076; G01R 31/2856
See application file for complete search history.

(56) References Cited

U.S. PATENT DOCUMENTS

| | | | |
|---|---|---|---|
| 8,566,931 B2 | 10/2013 | Modave et al. | |
| 9,523,736 B2 | 12/2016 | Hershman et al. | |
| 10,013,581 B2 | 7/2018 | Hershman | |
| 10,809,944 B1* | 10/2020 | Ostrikov | G06F 12/0246 |
| 2011/0029828 A1 | 2/2011 | Bancel et al. | |
| 2011/0122694 A1* | 5/2011 | Modave | G06F 21/755 326/8 |
| 2011/0267094 A1* | 11/2011 | La Rosa | G06F 21/552 327/566 |
| 2012/0084546 A1* | 4/2012 | Ogasawara | G06F 9/442 713/2 |
| 2012/0180124 A1* | 7/2012 | Dallas | G06F 21/46 726/22 |
| 2012/0255005 A1* | 10/2012 | Yoshimi | G06F 21/72 726/23 |
| 2017/0126408 A1* | 5/2017 | Van Someren | H04L 9/30 |
| 2017/0318039 A1* | 11/2017 | Kareti | H04L 63/1416 |
| 2019/0188391 A1 | 6/2019 | Margalit | |
| 2019/0229895 A1* | 7/2019 | Finkelstein | H04B 10/40 |

FOREIGN PATENT DOCUMENTS

| | | | | |
|---|---|---|---|---|
| WO | 1996000953 A2 | 1/1996 | | |
| WO | WO 2012/126611 A1 * | 9/2012 | ............. | G06F 21/02 |

* cited by examiner

*Primary Examiner* — Christopher A Revak
(74) *Attorney, Agent, or Firm* — Kligler & Associates Patent Attorneys Ltd

(57) ABSTRACT

An Integrated Circuit (IC) includes functional circuitry and protection circuitry. The protection circuitry is configured to maintain a counter value, which is indicative of a cumulative amount of hostile attacking attempted on the functional circuitry over a lifetime of the IC, to detect events indicative of suspected hostile attacks on the functional circuitry, to decide, responsively to a detected event, on an update of the counter value depending on a time difference between the detected event and a most recent power-up in the IC, and update the counter value in accordance with the decided update, and to disable at least part of the IC in response to the counter value crossing a threshold.

18 Claims, 2 Drawing Sheets

SECURE IC WITH SOFT SECURITY COUNTERMEASURES

FIELD OF THE INVENTION

The present invention relates generally to data security in electronic circuitry, and particularly to security countermeasures with variable sensitivity.

BACKGROUND OF THE INVENTION

Various techniques have been developed for tampering with electronic devices, e.g., for accessing secret information stored within the devices. For example, side-channel attacks attempt to extract information by non-invasively measuring electrical signals and/or electromagnetic radiation emitted from the devices. As another example, fault injection attacks typically involves causing a circuit or component to change its logical state and behavior in a way that assists the attacker. A fault injection attack may be launched, for example, by physically contacting signal lines, by applying high-power laser or electromagnetic pulses, or by causing glitches on power supply or other external interfaces.

SUMMARY OF THE INVENTION

An embodiment of the present invention that is described herein provides an Integrated Circuit (IC) including functional circuitry and protection circuitry. The protection circuitry is configured to maintain a counter value, which is indicative of a cumulative amount of hostile attacking attempted on the functional circuitry over a lifetime of the IC, to detect events indicative of suspected hostile attacks on the functional circuitry, to decide, responsively to a detected event, on an update of the counter value depending on a time difference between the detected event and a most recent power-up in the IC, and update the counter value in accordance with the decided update, and to disable at least part of the IC in response to the counter value crossing a threshold.

In some embodiments, the protection circuitry is configured to decide on the update such that an impact of the detected event on the counter value is inversely related to the time difference from the most recent power-up. In an embodiment, the protection circuitry is configured to attribute a severity to the detected event, the severity being inversely related to the time difference from the most recent power-up, and to decide on the update based on the severity.

In a disclosed embodiment, the protection circuitry is configured to update an event tolerance level upon expiry of one or more predefined time durations that are free of detected events, and to decide on the update depending on the event tolerance level. In another embodiment, the protection circuitry is configured to decide to update the counter value with a probability that is inversely related to the time difference from the most recent power-up.

In yet another embodiment, the protection circuitry is configured to decide to update the counter value with an update value whose size is inversely related to the time difference from the most recent power-up. In an embodiment, when the time difference from the most recent power-up exceeds a predefined duration, the protection circuitry is configured to delay the update by a predefined time delay.

In some embodiments, the protection circuitry is further configured to apply to the counter value opposite updates as a function of elapsed time, the opposite updates being opposite in direction relative to updates applied in response to detected events. In an example embodiment, the protection circuitry is configured to maintain the counter value by incrementing a first counter value to indicate the cumulative amount of attempted hostile attacking, incrementing a second counter value as a function of elapsed time, and deriving the counter value by subtracting the second counter value from the first counter value.

There is additionally provided, in accordance with an embodiment of the present invention, a method for protecting an Integrated Circuit (IC). The method includes maintaining in the IC a counter value, which is indicative of a cumulative amount of hostile attacking attempted on functional circuitry in the IC over a lifetime of the IC. Events indicative of suspected hostile attacks on the functional circuitry are detected. Responsively to a detected event, a decision is made on an update of the counter value depending on a time difference between the detected event and a most recent power-up in the IC, and the counter value is updated in accordance with the decided update. At least part of the IC is disabled in response to the counter value crossing a threshold.

The present invention will be more fully understood from the following detailed description of the embodiments thereof, taken together with the drawings in which:

DETAILED DESCRIPTION OF EMBODIMENTS

Overview

Figure 1:
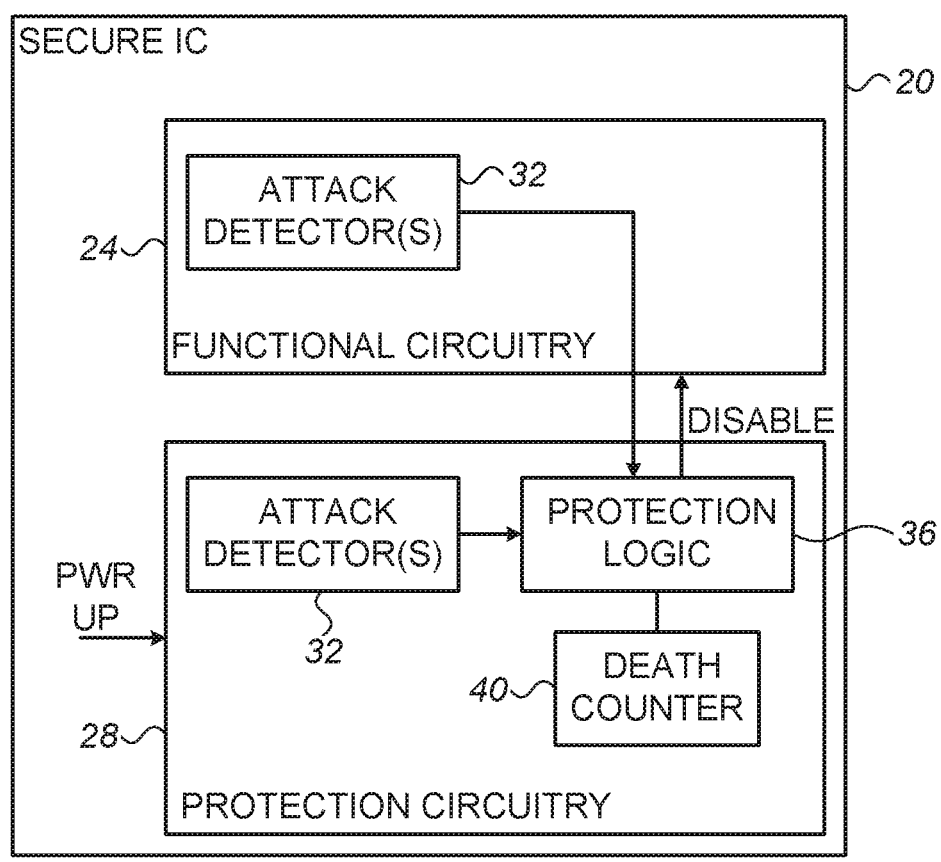
FIG. 1 is a block diagram that schematically illustrates a secure Integrated Circuit (IC) supporting soft security countermeasures, in accordance with an embodiment of the present invention.

Embodiments of the present invention that are described herein provide improved security countermeasures for protecting electronic circuitry against hostile attacks.

In some disclosed embodiments, a secure Integrated Circuit (IC) comprises functional circuitry, and protection circuitry that is configured to protect the functional circuitry from hostile attacks. The protection circuitry detects events that are suspected as indicative of hostile attacks on the functional circuitry, and in response initiates responsive action.

Some responsive actions involve incrementing a "death counter"—A counter value that tracks the cumulative amount of hostile attacking attempted on the functional circuitry over the lifetime of the IC. When the death counter exceeds a predefined threshold, at least part of the IC is disabled permanently. The death-counter mechanism prevents an attacker from subjecting the IC to a large number of repeated attacks, i.e., limits the number of attack attempts before rendering the IC useless.

Although highly effective, the death-counter mechanism is irreversible, and should therefore be used with caution. In particular, it is important to minimize the likelihood of incrementing the death counter due to innocent abnormal events being falsely interpreted as attacks.

In some embodiments, the protection circuitry reduces the likelihood of false death-counter updates, by modifying the tolerance of the death counter to detected events over time.

In practice, certain times in the IC lifecycle are particularly prone to attacks, whereas at other times there is a higher likelihood of innocent abnormal events. For example, the time period immediately following the IC power-up is regarded as attack-prone, since a common modus operandi is to switch the IC power off and on between successive attack attempts. The IC power-down period is typically characterized by smaller likelihood of attack, but on the other hand high likelihood of innocent abnormal events.

Thus, in some embodiments, upon detecting an event, the protection circuitry decides on whether and how to update of the death counter value, depending on the time difference between the detected event and the most recent power-up in the IC. The protection circuitry typically attributes a severity to the detected event, the severity being inversely related to the time difference between the event and the most recent power-up. In this manner, events that occur shortly after power-up have a large impact on the death counter, and events that occur a long time after power-up (e.g., during power-down) have a lesser effect on the death counter.

The protection circuitry may adjust the impact of a detected event on the counter update in various ways. In some embodiments, the protection circuitry modifies the probability of updating the death counter, e.g., decreases the probability as time elapses from power-up. In other embodiments the protection circuitry modifies the size of the update (i.e., the update step, or the value that is added or subtracted from the counter value per update). For example, the protection circuitry may reduce the update size over time.

In yet other embodiments, the protection circuitry delays the update by a certain delay if the time elapsed from the most recent power-up exceeds some predefined duration. Delaying the update is helpful for events that occur during power-down, in which case the IC will power-down before the delay expires and the death counter will not be updated.

Various time-dependent updating schemes, and other implementation examples of the disclosed technique, are described herein. In some example embodiments, the protection circuitry maintains a variable referred to as an event tolerance level (EVTL). For each EVTL, the protection circuitry defines how the death counter is updated in response to events, if at all. In absence of events, the protection circuitry gradually increases the EVTL in accordance with predefined time-out periods. The tolerance to events thus grows as a function of the time that elapsed from power-up.

System Description

FIG. 1 is a block diagram that schematically illustrates a secure Integrated Circuit (IC) 20 supporting soft security countermeasures, in accordance with an embodiment of the present invention. Secure IC 20 may comprise, for example, a secure processor used for performing cryptographic operations, a secure memory used for storing sensitive information, or any other suitable type of IC.

IC 20 comprises functional circuitry 24. The term "functional circuitry" refers to circuitry that is configured to perform the designated functions of IC 20, e.g., various processing and/or data storage operations. In addition, IC 20 comprises protection circuitry 28 that is configured to protect functional circuitry 24 against hostile attacks. The disclosed techniques can be used for protection against any suitable type of attack, e.g., fault injection attacks.

In the embodiment of FIG. 1, protection circuitry 28 comprises protection logic 36, which receives indications of detected events from one or more attack detectors 32, and in response initiates suitable responsive actions. In the present example, although not necessarily, one or more attack detectors are physically located in or near functional circuitry 24, and one or more attack detectors 32 are physically located in or near protection circuitry 28. Regardless of physical location, attack detectors 32 are regarded herein as part of protection circuitry 28.

Attack detectors may be configured to detect any suitable type of events, such as, for example, glitches on signal, clock or power lines, unexpected or illegal logic values at certain times, discrepancies between logic values of different signals, over-temperature, under-temperature and the like. Any such event might be indicative of an attack, but on the other hand could be innocent.

In various embodiments, protection logic 36 may initiate various kinds of responsive actions in response to detected events that are suspected as attacks. In the present example, protection circuitry 28 comprises a counter 40 that is referred to as a "death counter," which is updated by protection logic 36 in response to detected events.

Death counter 40 tracks the cumulative amount of hostile attacking attempted on functional circuitry 24 over the lifetime of IC 20. Typically, counter 40 is maintained in non-volatile memory (such as OTP, Flash, EEPROM or other suitable type of memory), and is initialized to some initial value during production or final testing of IC 20.

Over the lifetime of IC 20, protection logic 36 updates counter 40 in response to detected events. When death counter 40 crosses a predefined threshold, protection logic 36 disables at least part of the IC permanently. At this point the IC is inoperative and cannot be subjected to additional attacks.

In the description that follows, the assumption is that death counter 40 is initialized to zero, and then incremented over the lifetime of IC 20. Under this convention, a higher counter value corresponds to a higher amount of cumulative hostile attacking. This convention, however, is used purely by way of example. Alternatively, any other updating convention can be used. For example, the death counter may be initialized to some positive value and then decremented over the lifetime of IC, in which case a lower counter value corresponds to a higher amount of cumulative hostile attacking.

In addition to the death counter mechanism, protection logic 36 may initiate any other suitable responsive action, for example disable some or all of the IC, delete sensitive information or trigger an alert.

The configurations of IC 20 and its elements, as shown in FIG. 1, are example configurations that are depicted purely for the sake of conceptual clarity. In alternative embodiments, any other suitable configurations can be used. In various embodiments, IC 20 and its elements may be implemented using any suitable hardware, such as in an Application-Specific Integrated Circuit (ASIC) or Field-Programmable Gate Array (FPGA).

In some embodiments, some or all of the functions of protection circuitry 28 may be performed by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Relaxation of Death-Counter Updates as a Function of Time from Power-Up

As can be appreciated, the "death counter" mechanism is irreversible and leads to permanent disabling of IC 20 or parts thereof. It is therefore important to distinguish between events that are truly indicative of an attack and events that are abnormal but innocent, and update the death counter only in response to the former. In other words, it is important to reduce the likelihood that protection logic 36 updates death counter 40 in response to innocent abnormal events.

In some embodiments, protection logic 36 reduces the likelihood of false death-counter updates by setting different tolerances to detected events at different times. In particular, in some embodiments protection logic 36 sets a relatively low tolerance (i.e., updates death counter 40 with high sensitivity to events) shortly after power-up, under the assumption that attack attempts are likely to occur at such times. As time elapses from power-up, in absence of events, protection logic 36 gradually increases the tolerance to events (i.e., updates death counter 40 with lower sensitivity to events).

The above mechanism is especially useful in reducing the sensitivity to events during power-down periods. Power-down periods are especially prone to false updates of the death counter, because they are often characterized by occurrences of innocent abnormal events.

Generally put, upon detecting an event (e.g., upon receiving an indication from one of attack detectors 32) in some embodiments protection logic 36 decides on an update for death counter 40, depending on the time difference between the detected event and the most recent power-up in IC 20. Protection logic 36 updates the counter value in accordance with the decided update.

In the present context, the term "deciding on an update" refers to any decision that adjusts the impact of the event on the death counter update. Protection logic 36 may decide, for example, whether or not to update the death counter, by how much to update the death counter, with what likelihood to update the death counter, following what delay to update the death counter, etc. In some cases the decision will be that no update is warranted at all.

Figure 2:
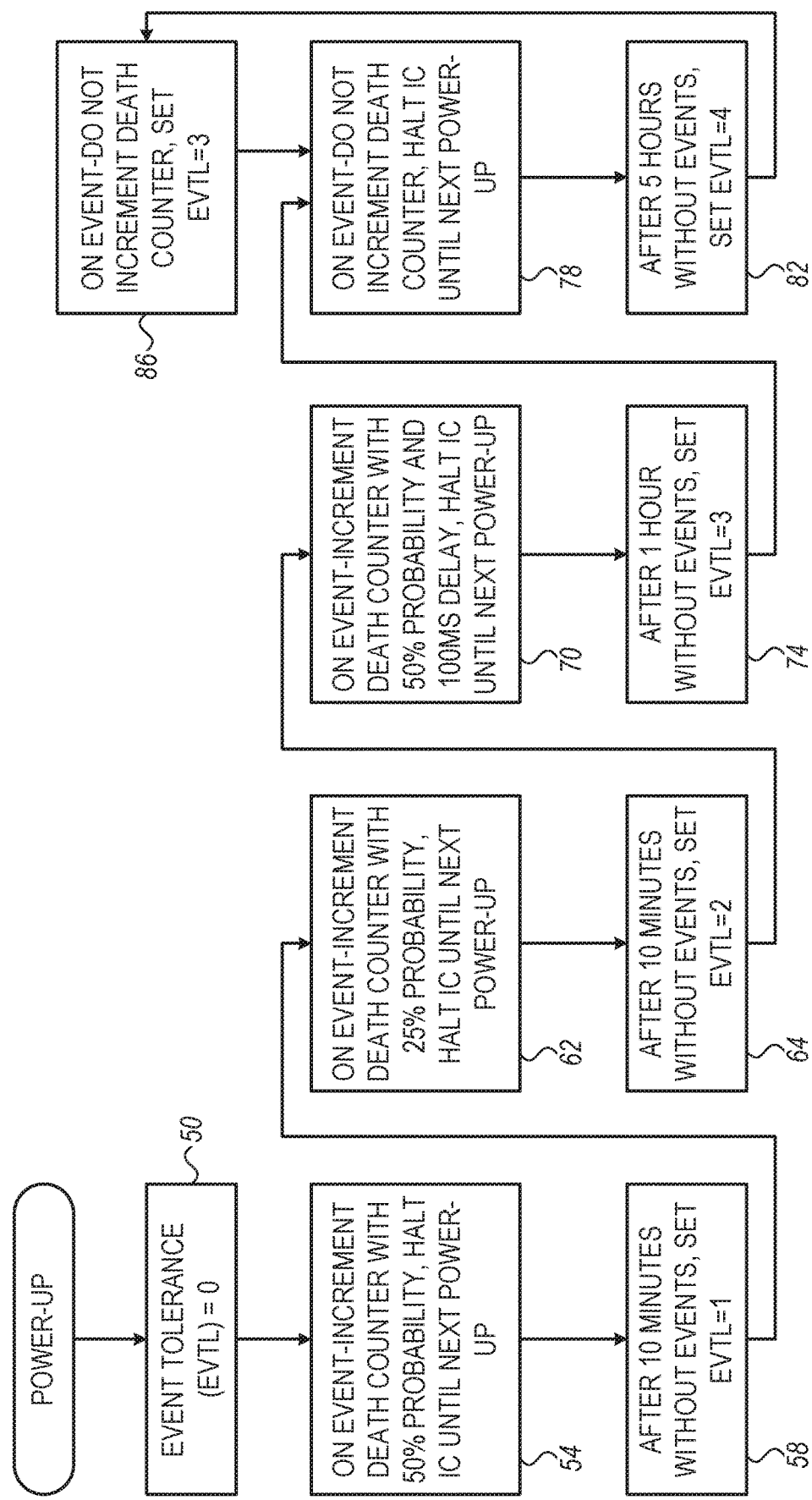
FIG. 2 is a flow chart that schematically illustrates a method for applying soft security countermeasures in a secure IC, in accordance with an embodiment of the present invention.

FIG. 2 is a flow chart that schematically illustrates an example method for applying soft security countermeasures in secure IC 20, in accordance with an embodiment of the present invention. The method of FIG. 2 demonstrates several ways of adjusting the impact of detected events on the update of death counter 40, depending on the time since power-up:

Protection logic 36 initializes an Event tolerance level (EVTL) at power-up, and gradually increases EVTL upon expiry of predefined time durations that are free of detected events. Death counter 40 is updated depending on EVTL.

Protection logic 36 updates death counter 40 with a probability that is inversely related to the time difference from the most recent power-up. (Updating the death counter with a probability p may be performed, for example, by generating a random number with uniform distribution between zero and unity, and updating the death counter if the random number is below p.)

At some high EVTL, typically a long time after power-up, protection logic 36 deliberately delays the update by a predefined delay after detecting the event. If the event happens to occur during power-down, the IC will typically power-down before the delay expires and the death counter will not be updated.

The method of FIG. 2 begins with protection logic 36 initializing EVTL to zero on power-up, at an EVTL initialization step 50.

While EVTL=0, at a EVTL=0 operation step 54, upon detecting an event, protection logic 36 increments death counter 40 with a 50% probability, and then halts IC 20 until the next power-up.

After ten minutes elapse without detected events, at an EVTL=0 expiry step 58, protection logic 36 increments the event tolerance level to EVTL=1.

While EVTL=1, at a EVTL=1 operation step 62, upon detecting an event, protection logic 36 increments death counter 40 with a 25% probability, and then halts IC 20 until the next power-up.

After ten minutes elapse without detected events, at an EVTL=1 expiry step 64, protection logic 36 increments the event tolerance level to EVTL=2.

While EVTL=2, at a EVTL=2 operation step 70, upon detecting an event, protection logic 36 increments death counter 40 with a 50% probability and following a 100 mSec delay, and then halts IC 20 until the next power-up.

After one hour elapses without detected events, at an EVTL=2 expiry step 74, protection logic 36 increments the event tolerance level to EVTL=3.

While EVTL=3, at a EVTL=3 operation step 78, upon detecting an event, protection logic 36 does not increment death counter 40, and only halts IC 20 until the next power-up.

After five hours elapse without detected events, at an EVTL=3 expiry step 82, protection logic 36 increments the event tolerance level to EVTL=4.

While EVTL=4, at a EVTL=4 operation step 86, upon detecting an event, protection logic 36 does not increment death counter 40, but rather decrements the event tolerance level to EVTL=3. The method then proceeds to EVTL=3 operation step 78, described above.

The logic and numerical values in FIG. 2 (e.g., probabilities of incrementing the death counter, and time periods for incrementing the event tolerance level) are examples that are depicted purely for the sake of conceptual clarity. In alternative embodiments, any other suitable logic and numerical values can be used.

In some embodiments, in addition to the counter updates described above, protection logic 36 applies opposite-direction updates to death counter 40 as a function of elapsed time. The opposite updates are opposite in direction (polarity) relative to the updates applied in response to detected events. For example, if the death counter is incremented in response to detected events, the protection logic may decrement the death counter gradually over time.

In some embodiments, instead of decrementing death counter 40, protection logic 36 maintains two counters, referred to as an "event counter" and a "recovery counter." The protection logic increments the event counter in response to detected events, and increments the recovery counter gradually over time. The actual value of the death counter, for purposes of countermeasure activation, is the subtraction of the recovery counter value from the event counter value. In this manner, the healing effect is achieved with counters that can only be incremented. In some cases, the "event counter" and a "recovery counter" are implemented as unary counters. This implementation is useful, for example, when the counters are implemented in OTP where changing bit value is possible in only one direction (e.g., logic 0 to logic 1 but not vice versa). In some embodiments the protection logic limits the death count (event counter minus recovery counter) to a minimum of zero, so that no "attack credentials" will be generated over the chip lifetime, and only healing of past attacks is possible.

In some embodiments, protection logic 36 may consider a combination of indications, from one or more attack detectors 32, as a single event for the purpose of updating the death counter. For example, a glitch detected by one detector 32, or an "almost timing violation" detected by another detector 32, may not be considered an event when each taken alone. When both indications are received together, e.g., within some predefined time proximity, protection logic 36 may consider them together as a detected event for the purpose of death counter updates.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
    functional circuitry; and
    protection circuitry, which is configured to:
        maintain a counter value, which is indicative of a cumulative amount of hostile attacking attempted on the functional circuitry over a lifetime of the IC;
        detect events indicative of suspected hostile attacks on the functional circuitry;
        responsively to a detected event, decide on an update of the counter value depending on a time difference between the detected event and a most recent power-up in the IC, and update the counter value in accordance with the decided update; and
        disable at least part of the IC in response to the counter value crossing a threshold.

2. The IC according to claim 1, wherein the protection circuitry is configured to decide on the update such that an impact of the detected event on the counter value is inversely related to the time difference from the most recent power-up.

3. The IC according to claim 1, wherein the protection circuitry is configured to attribute a severity to the detected event, the severity being inversely related to the time difference from the most recent power-up, and to decide on the update based on the severity.

4. The IC according to claim 1, wherein the protection circuitry is configured to update an event tolerance level upon expiry of one or more predefined time durations that are free of detected events, and to decide on the update depending on the event tolerance level.

5. The IC according to claim 1, wherein the protection circuitry is configured to decide to update the counter value with a probability that is inversely related to the time difference from the most recent power-up.

6. The IC according to claim 1, wherein the protection circuitry is configured to decide to update the counter value with an update value whose size is inversely related to the time difference from the most recent power-up.

7. The IC according to claim 1, wherein, when the time difference from the most recent power-up exceeds a predefined duration, the protection circuitry is configured to delay the update by a predefined time delay.

8. The IC according to claim 1, wherein the protection circuitry is further configured to apply to the counter value opposite updates as a function of elapsed time, the opposite updates being opposite in direction relative to updates applied in response to detected events.

9. The IC according to claim 1, wherein the protection circuitry is configured to maintain the counter value by:
    incrementing a first counter value to indicate the cumulative amount of attempted hostile attacking;
    incrementing a second counter value as a function of elapsed time; and
    deriving the counter value by subtracting the second counter value from the first counter value.

10. A method for protecting an Integrated Circuit (IC), the method comprising:
    maintaining in the IC a counter value, which is indicative of a cumulative amount of hostile attacking attempted on functional circuitry in the IC over a lifetime of the IC;
    detecting events indicative of suspected hostile attacks on the functional circuitry;
    responsively to a detected event, deciding on an update of the counter value depending on a time difference between the detected event and a most recent power-up in the IC, and updating the counter value in accordance with the decided update; and
    disabling at least part of the IC in response to the counter value crossing a threshold.

11. The method according to claim 10, wherein deciding on the update comprises setting an impact of the detected event on the counter value to be inversely related to the time difference from the most recent power-up.

12. The method according to claim 10, wherein deciding on the update comprises attributing a severity to the detected event, the severity being inversely related to the time difference from the most recent power-up, and deciding on the update based on the severity.

13. The method according to claim 10, wherein deciding on the update comprises updating an event tolerance level upon expiry of one or more predefined time durations that are free of detected events, and deciding on the update depending on the event tolerance level.

14. The method according to claim 10, wherein deciding on the update comprises deciding to update the counter value with a probability that is inversely related to the time difference from the most recent power-up.

15. The method according to claim 10, wherein deciding on the update comprises deciding to update the counter value with an update value whose size is inversely related to the time difference from the most recent power-up.

16. The method according to claim 10, wherein deciding on the update comprises, when the time difference from the most recent power-up exceeds a predefined duration, delaying the update by a predefined time delay.

17. The method according to claim 10, wherein maintaining the counter value comprises applying to the counter value opposite updates as a function of elapsed time, the opposite updates being opposite in direction relative to updates applied in response to detected events.

18. The method according to claim 10, wherein maintaining the counter value comprises:
    incrementing a first counter value to indicate the cumulative amount of attempted hostile attacking;
    incrementing a second counter value as a function of elapsed time; and deriving the counter value by subtracting the second counter value from the first counter value.

\* \* \* \* \*